United States Patent
Kawamura et al.

(10) Patent No.: US 8,170,753 B2
(45) Date of Patent: May 1, 2012

(54) VEHICLE AND METHOD OF DETERMINING WHETHER OR NOT TO STOP ENGINE MOUNTED IN VEHICLE

(75) Inventors: Naoki Kawamura, Takasago (JP); Junji Tamura, Kobe (JP); Takahiro Ogino, Akashi (JP); Seiichi Kai, Kobe (JP); Shinta Kawasetsu, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 1025 days.

(21) Appl. No.: 12/108,376

(22) Filed: Apr. 23, 2008

(65) Prior Publication Data

US 2009/0012676 A1    Jan. 8, 2009

(30) Foreign Application Priority Data

Apr. 27, 2007  (JP) .................................. 2007-119161

(51) Int. Cl.
*B60K 28/14* (2006.01)
*F02D 17/04* (2006.01)

(52) U.S. Cl. .......... 701/45; 701/103; 701/107; 701/112; 180/219; 180/282; 180/284

(58) Field of Classification Search .................. 180/219, 180/271, 282–285; 280/755; 701/1, 45, 701/103, 107, 112; 340/440
See application file for complete search history.

(56) References Cited

U.S. PATENT DOCUMENTS

| | | | |
|---|---|---|---|
| 7,124,016 B2 * | 10/2006 | Kakinuma | 701/112 |
| 7,445,074 B2 * | 11/2008 | Oohashi | 180/282 |
| 2002/0039951 A1 * | 4/2002 | Hasegawa | 477/183 |
| 2003/0132837 A1 * | 7/2003 | Hasegawa et al. | 340/440 |
| 2004/0050609 A1 * | 3/2004 | Machida et al. | 180/282 |
| 2004/0256170 A1 * | 12/2004 | Gaudiano | 180/282 |
| 2005/0161274 A1 * | 7/2005 | Tsuruta | 180/282 |
| 2006/0020385 A1 * | 1/2006 | Kakinuma | 701/112 |
| 2006/0054375 A1 * | 3/2006 | Kakinuma | 180/282 |
| 2006/0243514 A1 * | 11/2006 | Oohashi | 180/282 |

FOREIGN PATENT DOCUMENTS

| | | | |
|---|---|---|---|
| JP | 64-28086 | * | 1/1989 |
| JP | 2003-176734 | | 6/2003 |
| JP | 2006307782 A | | 11/2006 |

\* cited by examiner

*Primary Examiner* — Ruth Ilan (74) *Attorney, Agent, or Firm* — Alleman Hall McCoy Russell & Tuttle LLP (57) ABSTRACT

A vehicle including an engine, a tilting sensor configured to detect that a vehicle body of the vehicle has been tilted a predetermined angle or larger, a driving state sensor configured to detect a driving state of the vehicle using a component other than the tilting sensor, and a determiner configured to determine whether or not to stop the engine, based on a signal received from the tilting sensor, and a signal received from the driving state sensor.

7 Claims, 8 Drawing Sheets

VEHICLE AND METHOD OF DETERMINING WHETHER OR NOT TO STOP ENGINE MOUNTED IN VEHICLE

TECHNICAL FIELD

The present invention relates to a vehicle equipped with an engine, such as a motorcycle, a three-wheeled or four-wheeled all terrain vehicle, or personal watercraft (PWC), and a method of determining whether or not to stop the engine mounted in the vehicle.

BACKGROUND ART

In vehicles equipped with conventional fuel injection systems (FI systems), an ECU (electronic control unit) causes a fuel injector to inject a predetermined amount of fuel to an interior of an air-intake passage connected to an engine. In a such a fuel injection type vehicle, a tilting sensor detects that a body of the vehicle is tilted, and the ECU causes the fuel injector to stop fuel injection, thereby forcibly stopping the engine, when the tilting sensor detects that the body is tilted a specified angle or larger.

Riders often jump motocross motorcycles when traveling over bumpy mountain roads or when traveling off-road. In such circumstances, a rider may intentionally tilt a vehicle body of the motorcycle to maintain control of the posture of the motorcycle. In such a case, it is difficult for an ECU to determine whether or not to stop the engine, based only on a signal from a tilting sensor that detects that the vehicle body is tilted.

In off-road racing, for example, when the vehicle body of the motorcycle has fallen and is slightly tilted while a rider continues gripping a grip of a steering handle in a standing position, the rider may want to raise the vehicle body immediately to resume riding, without stopping the engine. In this case, it is not necessary to stop the engine, but it is difficult to determine whether or not to stop the engine only based on the signal from the tilting sensor.

SUMMARY OF THE INVENTION

The present invention addresses the above described condition, and an object of the present invention is to provide a vehicle which is capable of determining whether or not to stop an engine precisely, depending on a driving state of the vehicle.

According to one aspect of the present invention, there is provided a vehicle comprising an engine; a tilting sensor configured to detect that a body of the vehicle is tilted a predetermined angle or larger; a driving state sensor configured to detect a driving state of the vehicle using a component other than the tilting sensor; and a determiner configured to determine whether or not to stop the engine, based on a signal received from the tilting sensor, and a signal received from the driving state sensor.

In such a configuration, it is determined whether or not to stop the engine, based on the signal received from the driving state sensor, in addition to the signal received from the tilting sensor. So, it can be determined that the engine should not be stopped even though the body of the vehicle is tilted the predetermined angle or larger. This makes it possible to distinguish between a case where the vehicle body is tilted the predetermined angle or larger and the engine should be stopped, and a case where the vehicle body is tilted the predetermined angle or larger but the engine should not be stopped. Thus, it can be determined whether or not to stop the engine precisely, based on the driving state in addition to the tilting angle of the vehicle.

The driving state sensor may be a throttle opening degree sensor configured to detect an opening degree of a throttle valve provided within an air-intake passage connected to the engine. The determiner may be configured to determine that the engine should be stopped when the tilting sensor detects that the body of the vehicle is tilted the predetermined angle or larger and the opening degree of the throttle valve which is detected by the throttle opening degree sensor continues to be smaller than a predetermined value for a predetermined time period.

In such a configuration, when the opening degree of the throttle valve continues to be smaller than the predetermined value for the predetermined time period, it may be estimated that the driver driving the vehicle does not have an intention to operate a throttle grip of a steering handle. This is not the case where the driver is tilting the body of the vehicle intentionally or is starting the vehicle immediately after the body has fallen. In this case, therefore, it may be determined that the engine should be stopped.

The opening degree of the throttle valve may be smaller than the predetermined value in a state where an engine speed of the engine is an idling engine speed.

In such a configuration, since it may be presumed that the driver does not have an intention to start the vehicle, it may be determined that the engine should be stopped.

The driving state sensor may be at least one of a throttle opening degree sensor configured to detect an opening degree of a throttle valve provided within an air-intake passage connected to the engine; an engine speed sensor configured to detect an engine speed of the engine; a clutch switch configured to detect an ON operation and an OFF operation of a clutch in the vehicle; a brake switch configured to detect an ON operation and an OFF operation of a brake in the vehicle; a gear position sensor configured to detect a gear position of a transmission gear in the vehicle; an acceleration sensor configured to detect an acceleration of the vehicle; a vehicle speed sensor configured to detect a vehicle speed of the vehicle; a GPS sensor configured to detect a location of the vehicle; a grip pressure-sensitive sensor configured to detect a pressure applied by a driver to grip a steering handle in the vehicle; and a suspension stroke sensor configured to detect a suspension stroke amount of a suspension in the vehicle, which is substantially vertically displaceable.

In such a configuration, it can be determined whether or not to stop the engine precisely, based on various driving states of the vehicle, when the tilting sensor detects that the body of the vehicle is tilted the predetermined angle or larger.

To be more specific, when the engine speed sensor is used as the driving state sensor, the determiner may determine that the driver does not have an intention to continue driving the vehicle and the engine should be stopped, if the signal received from the engine speed sensor indicates that the engine speed continues to decrease for a predetermined time period or continues to be an idling engine speed for a predetermined time period.

When the clutch switch is used as the driving state sensor, the determiner may determine that the vehicle is not being driven by the driver and the engine should be stopped, if the signal received from the clutch switch indicates that the driver does not operate the clutch for a predetermined time period.

When the brake switch is used as the driving state sensor, the determiner may determine that the vehicle is not being driven by the driver and the engine should be stopped, if the signal received from the brake switch indicates that the driver does not operate the brake for a predetermined time period.

When the gear position sensor is used as the driving state sensor, the determiner may determine that the vehicle is not being driven by the driver and the engine should be stopped, if the signal received from the gear position sensor indicates that the gear position does not change for a predetermined time period.

When the acceleration sensor is used as the driving state sensor, the determiner may determine that the vehicle is not being driven by the driver and the engine should be stopped, if the signal received from the acceleration sensor indicates that the acceleration of the vehicle does not change a predetermined value or larger for a predetermined time period.

When the vehicle speed sensor is used as the driving state sensor, the determiner may determine that the driver does not have an intention to continue driving the vehicle and the engine should be stopped, if the signal received from the vehicle speed sensor indicates that the vehicle speed of the vehicle in a driving direction continues to be smaller than a predetermined value for a predetermined time period.

When the GPS sensor is used as the driving state sensor, the determiner may determine that the vehicle is not being driven by the driver and the engine should be stopped, if the signal received from the GPS sensor indicates that the vehicle does not move for a predetermined time period.

When the grip pressure-sensitive sensor is used as the driving state sensor, the determiner may determine that the vehicle is not being driven by the driver and the engine should be stopped, if the signal received from the grip pressure-sensitive sensor indicates that the driver does not grip the steering handle for a predetermined time period.

When the suspension stroke sensor is used as the driving state sensor, the determiner may determine that the engine should be stopped, if the signal received from the suspension stroke sensor indicates that the suspension stroke amount does not become smaller than a predetermined value within a predetermined time period before the suspension stroke amount reaches a maximum value. For example, in racing, when the body of the vehicle is tilted to a great angle while jumping, the suspension stroke amount becomes small for a moment before the body of the vehicle jumps and then reaches the maximum value while jumping because the body is not subjected to a load from a ground surface. Therefore, only when the suspension stroke amount does not comply with such an event, it may be determined that the engine should be stopped. As a result, when the body of the vehicle is jumping and tilted according to the driver's intention, it is determined that the engine should not be stopped.

The vehicle may further comprise a fuel injector configured to inject a fuel to an interior of an air-intake passage connected to the engine; and a fuel controller configured to control an operation of the fuel injector. The fuel controller may be configured to cause the fuel injector to stop fuel injection to the interior of the air-intake passage when the determiner determines that the engine should be stopped. As used herein, the term "fuel injector" may include a fuel injector which directly injects the fuel to a cylinder of the engine.

In such a configuration, if the determiner determines that the engine should be stopped, the fuel controller electronically controls the fuel injector to stop fuel injection, thereby stopping the engine immediately.

The predetermined angle may be substantially 70 degrees.

When the body of the vehicle is tilted substantially 70 degrees or larger, it may be estimated that the vehicle is not driving around a corner, but has fallen, and therefore, it may be determined that the engine should be stopped.

The vehicle may further comprise a suspension stroke sensor configured to detect a suspension stroke amount of a suspension in the vehicle which is substantially vertically displaceable. The determiner may be configured to determine that the engine should not be stopped when the suspension stroke amount detected by the suspension stroke sensor reaches a maximum value and becomes smaller than a predetermined value within a predetermined time period before a time point when the suspension stroke amount reaches the maximum value.

In general, the suspension stroke amount becomes small for a moment before the body of the vehicle jumps and then reaches the maximum value while jumping because the body is not subjected to a load from a ground surface. As a result, it becomes possible to avoid that it is determined that the engine should be stopped, when the body of the vehicle is jumping and tilted according to the driver's intention.

The vehicle may be a motorcycle.

Since the vehicle body of the motorcycle is likely to be tilted during normal driving, the present invention is suitably applied to the motorcycle.

The vehicle may be an off-road motorcycle.

Since the off-road motorcycle is likely to continue driving even if its vehicle body is tilted, the present invention is suitably applied to the motorcycle.

According to another aspect of the present invention, there is provided a method of determining whether or not to stop an engine mounted in a vehicle, comprising detecting that a body of the vehicle is tilted a predetermined angle or larger; detecting an opening degree of a throttle valve provided within an air-intake passage connected to the engine; determining that the engine should be stopped when it is detected that the body of the vehicle is tilted the predetermined angle or larger and the opening degree of the throttle valve continues to be smaller than a predetermined value for a predetermined time period; and stopping fuel injection to an interior of the air-intake passage connected to the engine, when it is determined that the engine should be stopped.

In this method, it is determined that the engine should be stopped when the driver does not have an intention to operate a throttle grip of the steering handle, instead of only based on the tilting state of the vehicle body of the vehicle. As a result, it can be determined whether or not to stop the engine based on the driving state of the vehicle other than the tilting angle of the body of the vehicle, in addition to the tilting angle of the body of the vehicle.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the accompanying drawings. In the embodiments, the directions are referenced from the perspective of a driver (not shown) mounting a motorcycle.
(Embodiment 1)

Figure 1:
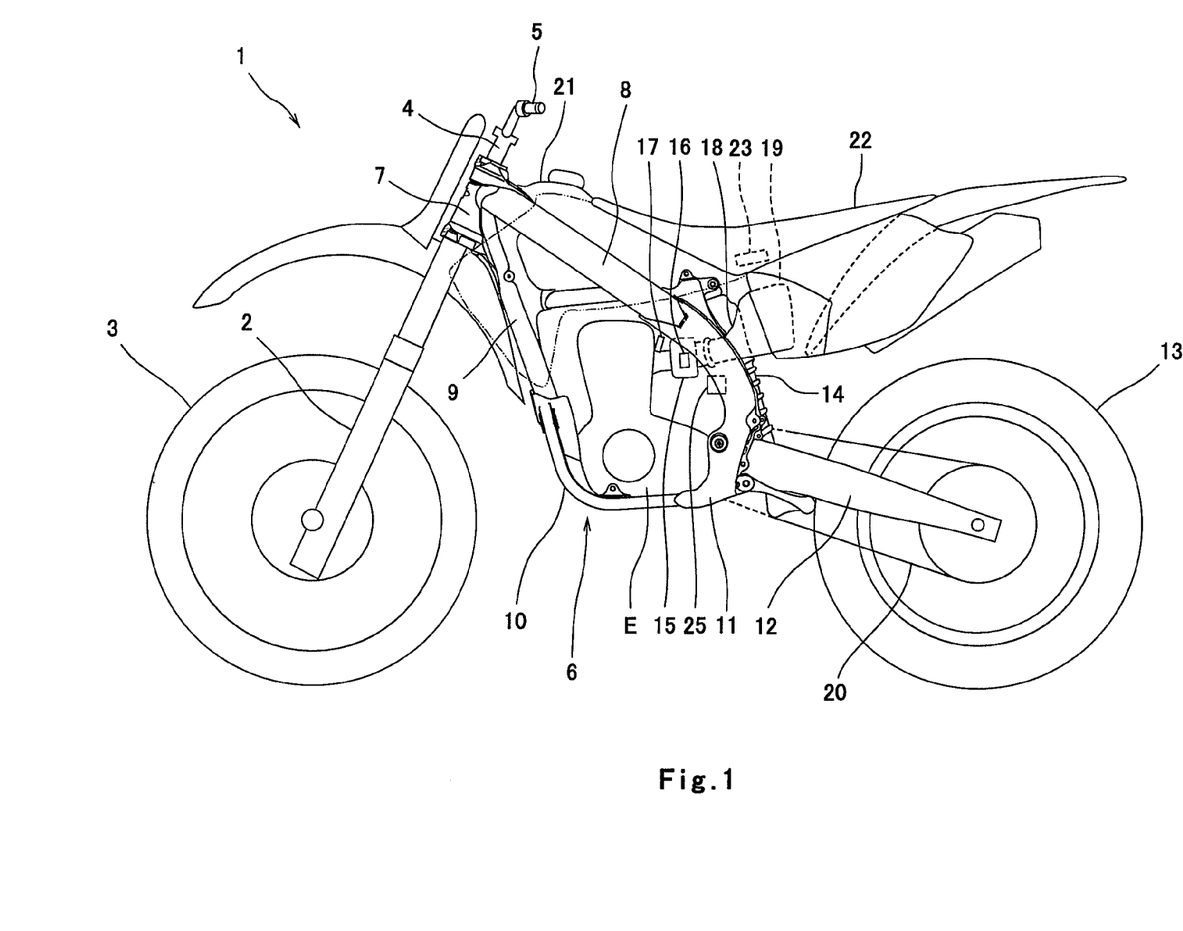
FIG. 1 is a side view of a motorcycle according to a first embodiment of the present invention.

FIG. 1 is a side view of a motorcycle 1 according to a first embodiment of the present invention. As shown in FIG. 1, the motorcycle 1 is an off-road motorcycle. The motorcycle 1 includes a front fork 2 extending substantially vertically to have a specified caster angle, and a front wheel 3, which is a steering wheel and is rotatably mounted to a lower end portion of the front fork 2. The front fork 2 is mounted at an upper portion thereof to a lower bracket and an upper bracket which are not shown. A bar-type steering handle 5 is attached to a handle support portion 4 on an upper part of the upper bracket. A steering shaft (not shown) is rotatably mounted by a head pipe 7 forming a frame 6. A driver rotates the steering handle 5 to the right or to the left, thereby steering the front wheel 3.

The frame 6 includes the head pipe 7, and a pair of right and left main pipes 8 extending rearward from an upper portion of the head pipe 7 so as to be tilted slightly in a downward direction. Down tubes 9 extend downward to be tilted slightly in a rearward direction from a lower portion of the head pipe 7. Lower pipes 10 extend rearward from lower portions of the down tubes 9 so as to be curved so as to be substantially L-shaped in a side view. The main pipes 8 are respectively coupled at rear portions thereof to rear portions of the lower pipes 10 by a pair of right and left swing arm brackets 11. Swing arms 12 extending substantially in a longitudinal direction of the motorcycle 1 are respectively pivotally attached at front end portions thereof to the swing arm brackets 11. A rear wheel 13, which is a drive wheel, is rotatably mounted to rear portions of the swing arms 12. A suspension 14 is disposed between an upper portion of each swing arm bracket 11 and the corresponding swing arm bracket 12 so as to extend substantially vertically between the right and left swing arm brackets 11. Apart from the head pipe 7, the frame 6 may be formed of other suitable frame members having desired stiffness, instead of the above pipes.

An engine E is mounted in a space defined by the head pipe 7, the main pipes 8, the down tubes 9, the lower pipes 10, and the swing arm brackets 11, forming the frame 6, and is fastened to the frame 6. A known throttle device 15 is coupled to an air-intake port of a cylinder part of the engine E. The throttle valve 15 is configured to control an amount of air taken in from outside and supplied to the engine E in such a manner that a butterfly throttle valve (not shown) fixed to a throttle shaft (not shown) is opened and closed. A throttle opening degree sensor 16 is attached on a left end portion of the throttle shaft (not shown) to detect a rotational angle of the throttle shaft to thereby detect an opening degree of the throttle valve. A fuel injector 17 is mounted in the vicinity of the air-intake port of the engine E and is configured to inject a predetermined amount of fuel to an interior of a region of the air-intake passage which is located downstream of the throttle valve in a flow direction of the air.

An air-intake duct 18 is coupled to a rear portion of the throttle device 15 so as to extend rearward between the swing arm bracket 11 and the rear suspension 14. An air cleaner 19 is coupled to a rear portion of the air-intake duct 18. A driving power generated in the engine E is transmitted to the rear wheel 13 through an output shaft (not shown) and a chain 20. A fuel tank 21 is disposed above the main pipe 8, and a seat 22 which is straddled by the driver is mounted behind the fuel tank 21. An ECU (electronic control unit) 23 is disposed below the seat 22 to control various components of the motorcycle 1. A tilting sensor 25 is attached to an inner side surface of the swing arm bracket 11 in a location in the vicinity of the throttle device 15.

Figure 2:
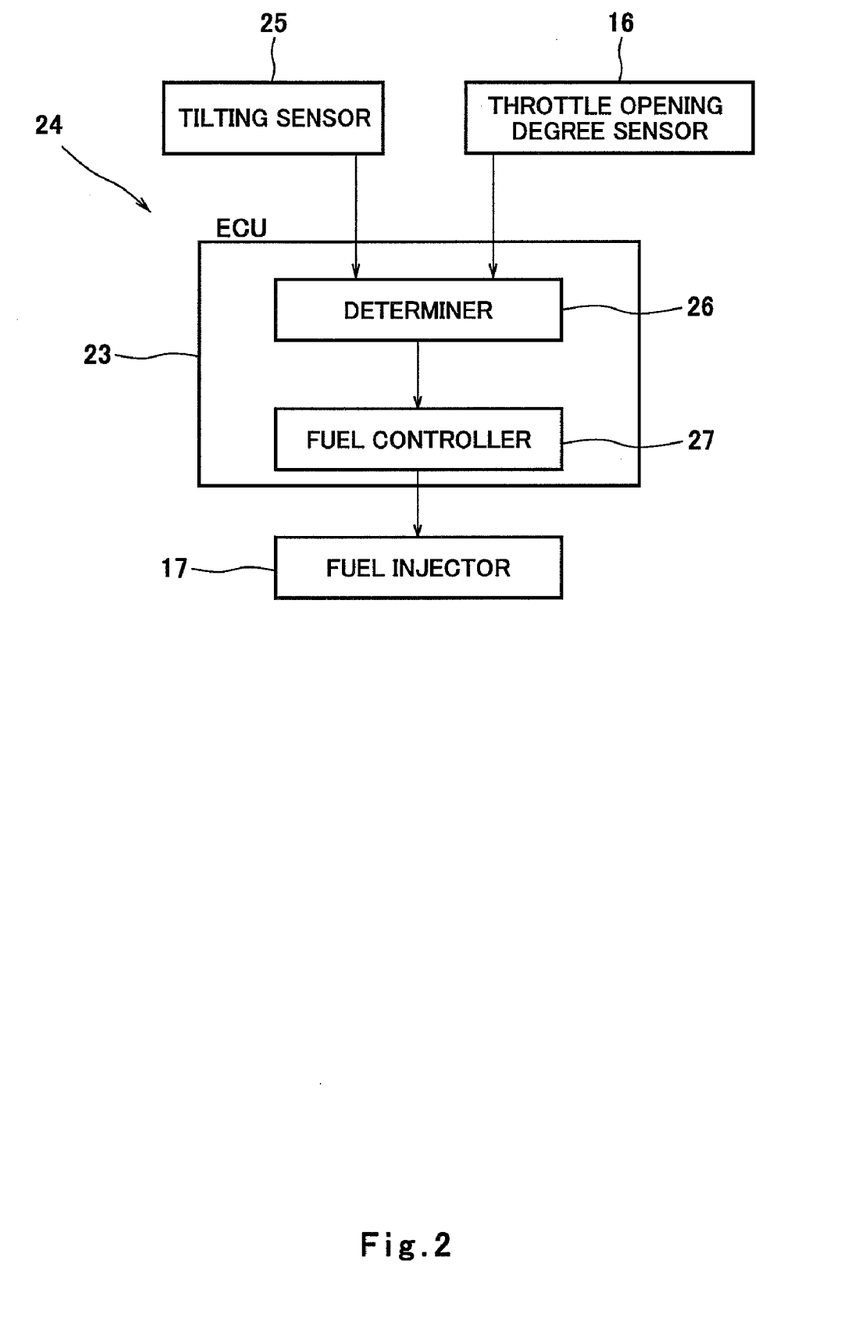
FIG. 2 is a block diagram showing an engine stop system of the motorcycle of FIG. 1.

FIG. 2 is a block diagram showing an engine stop system 24 of the motorcycle 1 of FIG. 1. Turning to FIG. 2, the engine stop system 24 includes the tilting sensor 25, the throttle opening degree sensor 16, the ECU 23, and the fuel injector 17. The tilting sensor 25 is configured to detect that a vehicle body of the motorcycle 1 is tilted a predetermined angle or larger, as described later. The throttle opening degree sensor 16, which serves as a driving state sensor, is configured to detect an opening degree of the throttle valve. The fuel injector 17 is configured to inject a predetermined amount of fuel to an interior of the intake passage connected to the engine E or to an interior of a cylinder. The ECU 23 is configured to control the fuel injector 17 based on a signal received from the tilting sensor 25 and a signal received from the throttle opening degree sensor 16. To be more specific, the ECU 23 includes a determiner 26 which determines whether or not to stop the engine E of the motorcycle 1 based on the signals received from the tilting sensor 25 and from the throttle opening degree sensor 16, and a fuel controller 27 which controls an operation of the fuel injector 17 to stop fuel injection to the interior of the air-intake passage, if the determiner 26 determines that the engine E should be stopped.

Figure 3:
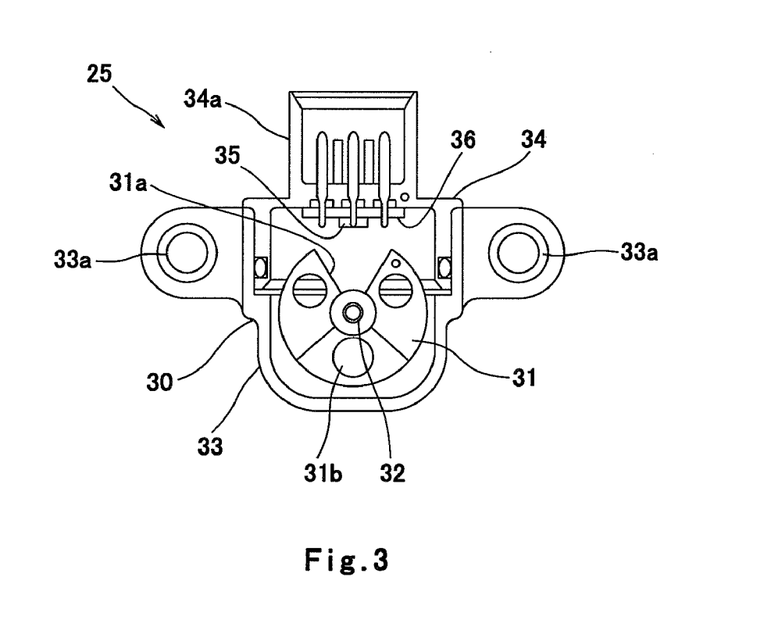
FIG. 3 is a front view of a tilting sensor of the engine stop system of FIG. 2.
Figure 4:
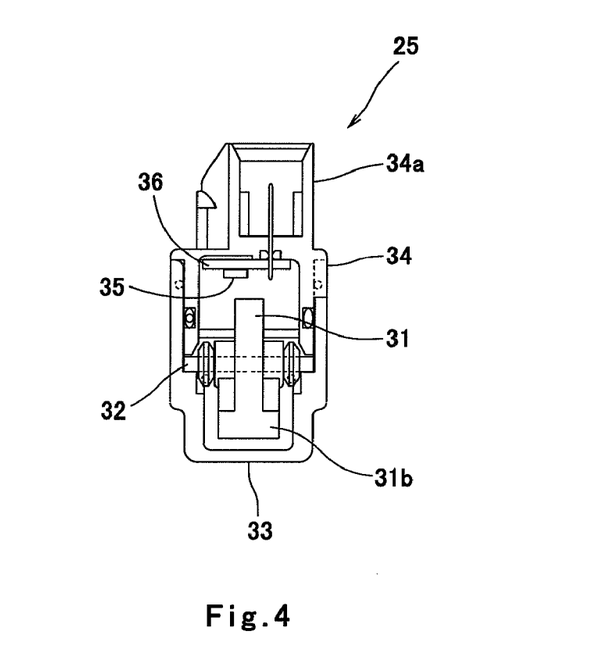
FIG. 4 is a side cross-sectional view of the tilting sensor of FIG. 3.

FIG. 3 is a front view of the tilting sensor 25 of the engine stop system 24 of FIG. 2. FIG. 4 is a side cross-sectional view of the tilting sensor 25 of FIG. 3. As shown in FIGS. 3 and 4, the tilting sensor 25 includes within a casing 30 a magnetized movement 31 which swings like a pendulum and is rotatably mounted to a rotational shaft 32. The case 30 includes a lower case 33 and an upper case 34. Mounting seats 33a are provided on the lower case 33 by which the lower case 33 is fastened to the frame 6 (see FIG. 1). A circuit board 36 is mounted in an interior of the upper case 34. A Hall effect sensor integrated circuit (IC) 35 is provided on the circuit board 36 to detect that the movement 31 has been rotated a predetermined angle or larger. The circuit board 36 has a detection circuit which outputs a detection signal when the Hall effect sensor IC 35 detects that the movement 31 has been rotated the predetermined angle or larger.

A connector portion 34a is formed in the upper case 34 to accommodate a power supply coupled to the circuit board 36 and an earth wire and terminals for outputting the detection signal. The movement 31 has in an upper part thereof a cut portion 31a with a specified open angle to be laterally symmetric with respect to a reference position, and in a lower part thereof a spindle portion 31b positioned so that the spindle portion 31b and the cut portion 31a are symmetric with respect to the rotational shaft 32. The Hall effect sensor IC 35 is unipolar-sensitive, and is configured to be able to detect that the movement 31 has been rotated the predetermined angle or larger when the movement 31 has been rotated and a magnetized south pole or north pole of the movement 31 is opposite to a specified position of the Hall effect sensor IC 35.

Figure 5:
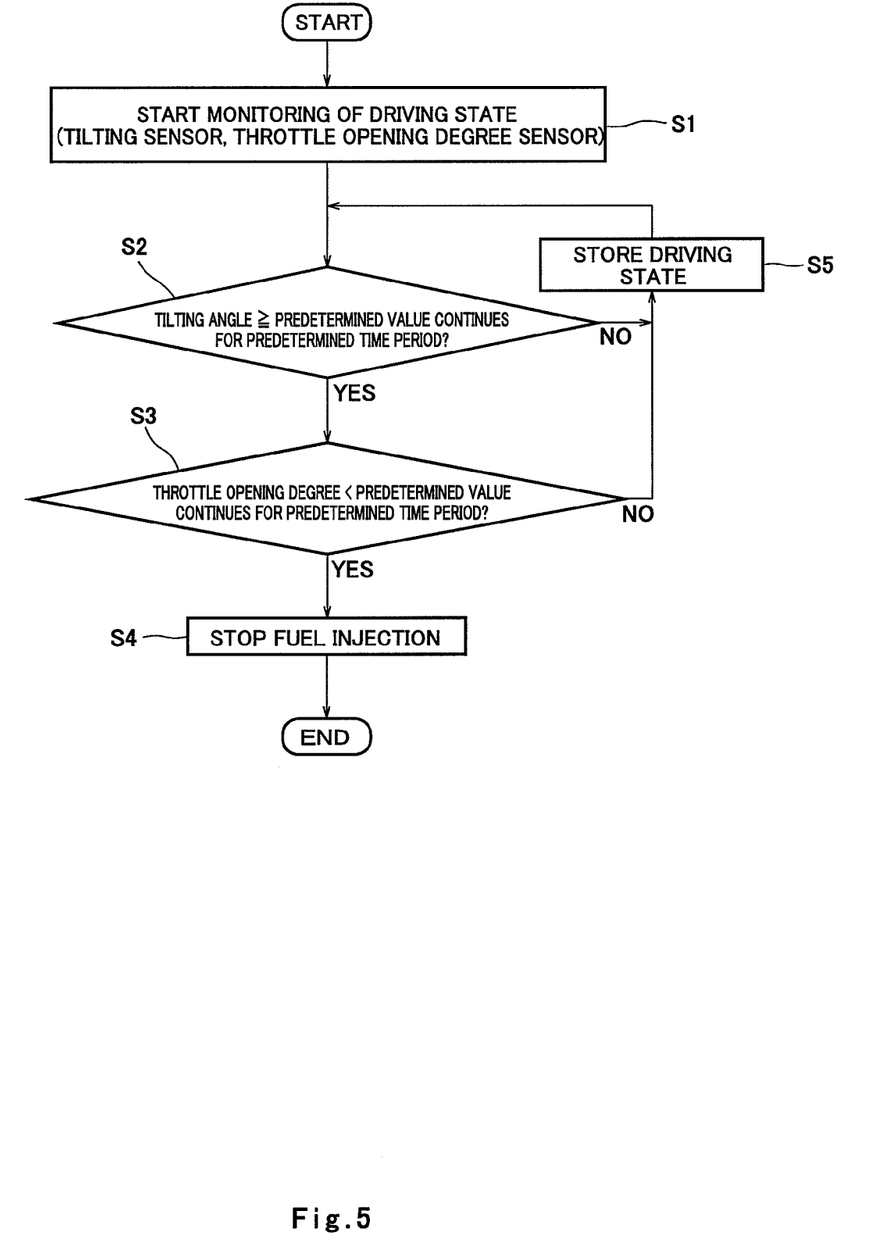
FIG. 5 is a flowchart showing a process executed by the engine stop system of FIG. 2.

Subsequently, the process executed by the engine stop system 24 will be described substantially with reference to FIG. 5. FIG. 5 is a flowchart showing the process executed by the engine stop system 24 of FIG. 2. Turning to FIG. 5, when the engine E of the motorcycle 1 starts, the determiner 26 (see FIG. 2) of the ECU 23 starts monitoring of a driving state of the motorcycle 1 based on a signal received from the tilting sensor 25 and a signal received from the throttle opening degree sensor 16 (step S1). The determiner 26 calculates a tilting angle of the vehicle body based on the signal received from the tilting sensor 25 and determines whether or not the tilting angle of the vehicle body continues to be a predetermined value or larger (e.g., 70 degrees or larger) for a predetermined time period (step S2).

If it is determined that the tilting angle does not continue to be the predetermined value or larger for the predetermined time period (NO in step S2), the ECU 23 stores its driving state (time series history of the tilting angle of the vehicle body) in a memory (not shown) contained therein (step S5), and returns the process to step S2. On the other hand, if it is determined that the tilting angle of the vehicle body continues to be the predetermined value or larger for the predetermined time period (YES in step S2), the determiner 26 calculates a throttle opening degree based on the signal received from the throttle opening degree sensor 16, and further determines whether or not the throttle opening degree continues to be smaller than a predetermined value (e.g., in an idling state) for a predetermined time period (step S3).

If it is determined that the throttle opening degree does not continue to be smaller than the predetermined value for the predetermined time period (NO in step S3), the ECU 23 determines that the engine E should not be stopped, and stores its driving state (time series history of the throttle opening degree) in the memory contained therein (step S5), and returns the process to step S2. On the other hand, if it is determined that the throttle opening degree continues to be smaller than the predetermined value for the predetermined time period (YES in step S3), the determiner 26 estimates that the driver does not have an intention to operate a throttle grip of the steering handle 5, and therefore determines that the engine E should be stopped, causing the fuel injector 17 (see FIG. 2) to stop fuel injection (step S4).

In the above described configuration, it is determined whether or not to stop the engine E, based on the signal received from the throttle opening degree sensor 16 in addition to the signal received from the tilting sensor 25. So, it can be predetermined that the engine E should not be stopped even though the vehicle body of the motorcycle 1 is tilted the predetermined angle or larger. This makes it possible to distinguish between a case where the vehicle body is tilted the predetermined angle or larger and the engine should be stopped, and a case where the vehicle body is tilted the predetermined angle or larger but the engine should not be stopped. Thus, it can be determined whether or not to stop the engine E precisely based on the driving state of the motorcycle 1 such as the throttle opening degree of the throttle valve, in addition to the tilting angle of the vehicle body of the motorcycle 1.

(Embodiment 2)

Figure 6:
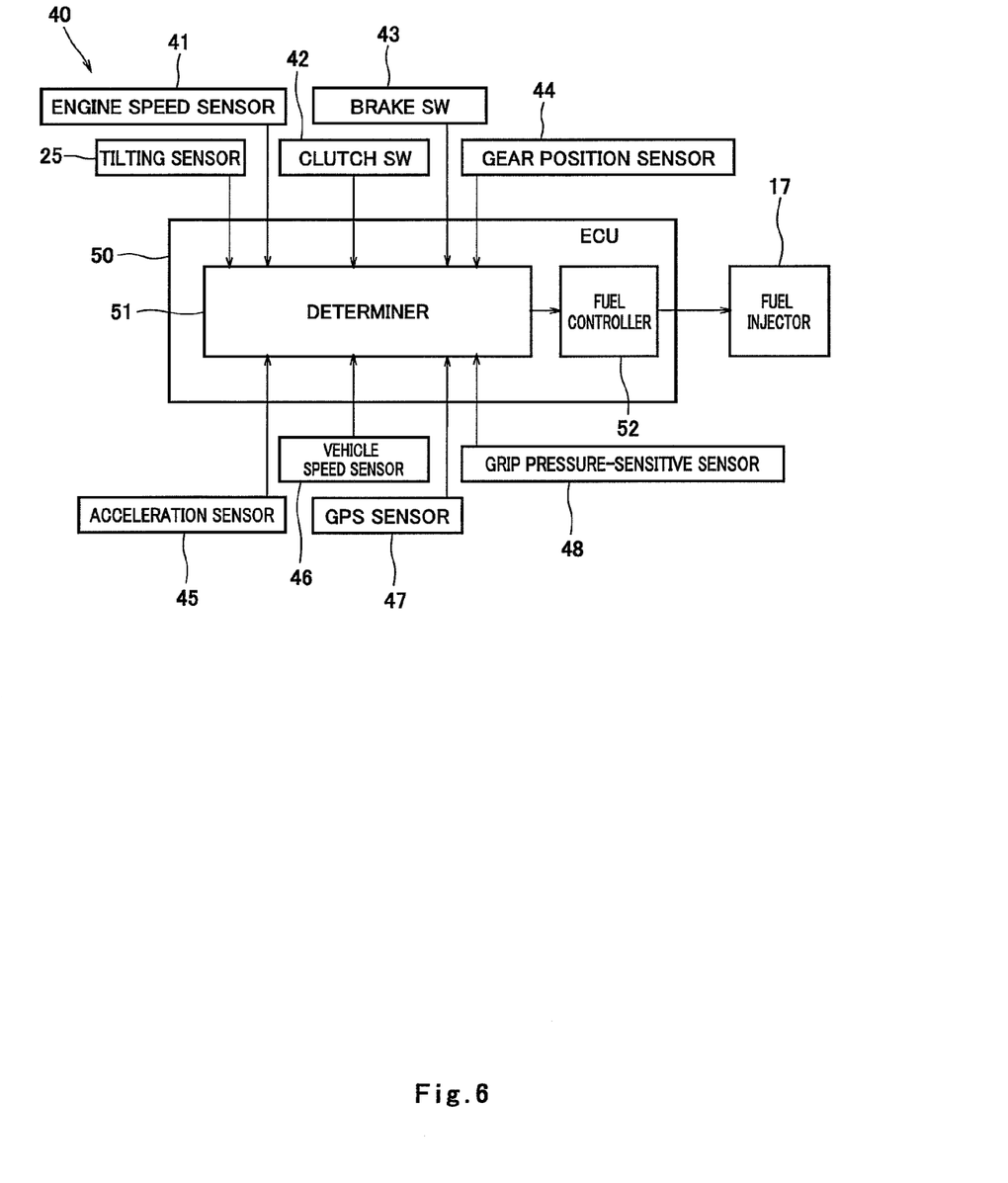
FIG. 6 is a block diagram showing an engine stop system of a motorcycle according to a second embodiment of the present invention.

FIG. 6 is a block diagram showing an engine stop system 40 of a motorcycle according to a second embodiment of the present invention. In FIG. 6, the same reference numerals as those in the first embodiment denote the same or corresponding parts which will not be further described in the second embodiment. Turning to FIG. 6, the engine stop system 40 includes the tilting sensor 25, an engine speed sensor 41, a clutch switch 42, a brake switch 43, a gear position sensor 44, an acceleration sensor 45, a vehicle speed sensor 46, a GPS sensor 47, a grip pressure-sensitive switch 48, an ECU 50, and the fuel injector 17.

The engine speed sensor 41 is a crank angle sensor coupled to a crankshaft of the engine E (see FIG. 1) and is configured to be able to detect an engine speed of the engine E which is obtained by calculation of a change amount of a crank angle of the crankshaft per unit time in the ECU 50. The clutch switch 42 is configured to detect an ON operation and an OFF operation of a clutch (not shown) in the motorcycle 1. The brake switch 43 is configured to detect an ON operation and an OFF operation of a brake (not shown) in the motorcycle 1. The gear position sensor 44 is configured to detect a gear position of a transmission gear in the motorcycle 1. The acceleration sensor 45 is configured to detect an acceleration of the motorcycle 1. The vehicle speed sensor 46 is configured to detect a vehicle speed of the motorcycle 1. The GPS sensor 47 is configured to detect a location of the motorcycle or a moving state of the motorcycle 1, by utilizing a GPS (global positioning system). The grip pressure-sensitive sensor 48 is configured to detect a pressure applied by the driver to grip the steering handle 5 (see FIG. 1).

The ECU 50 is configured to control the fuel injector 17 based on the signal received from the tilting sensor 25 and signals received from the sensors and switches 41 to 48 which serve as driving state sensors. To be more specific, the ECU 50 includes a determiner 51 which determines whether or not to stop the engine E based on the signals received from the tilting sensor 25 and from the sensors and switches 41 to 48, and a fuel controller 52 which controls an operation of the fuel injector 17 to stop fuel injection to the interior of the air-intake passage, when the determiner 51 determines that the engine E should be stopped.

Figure 7:
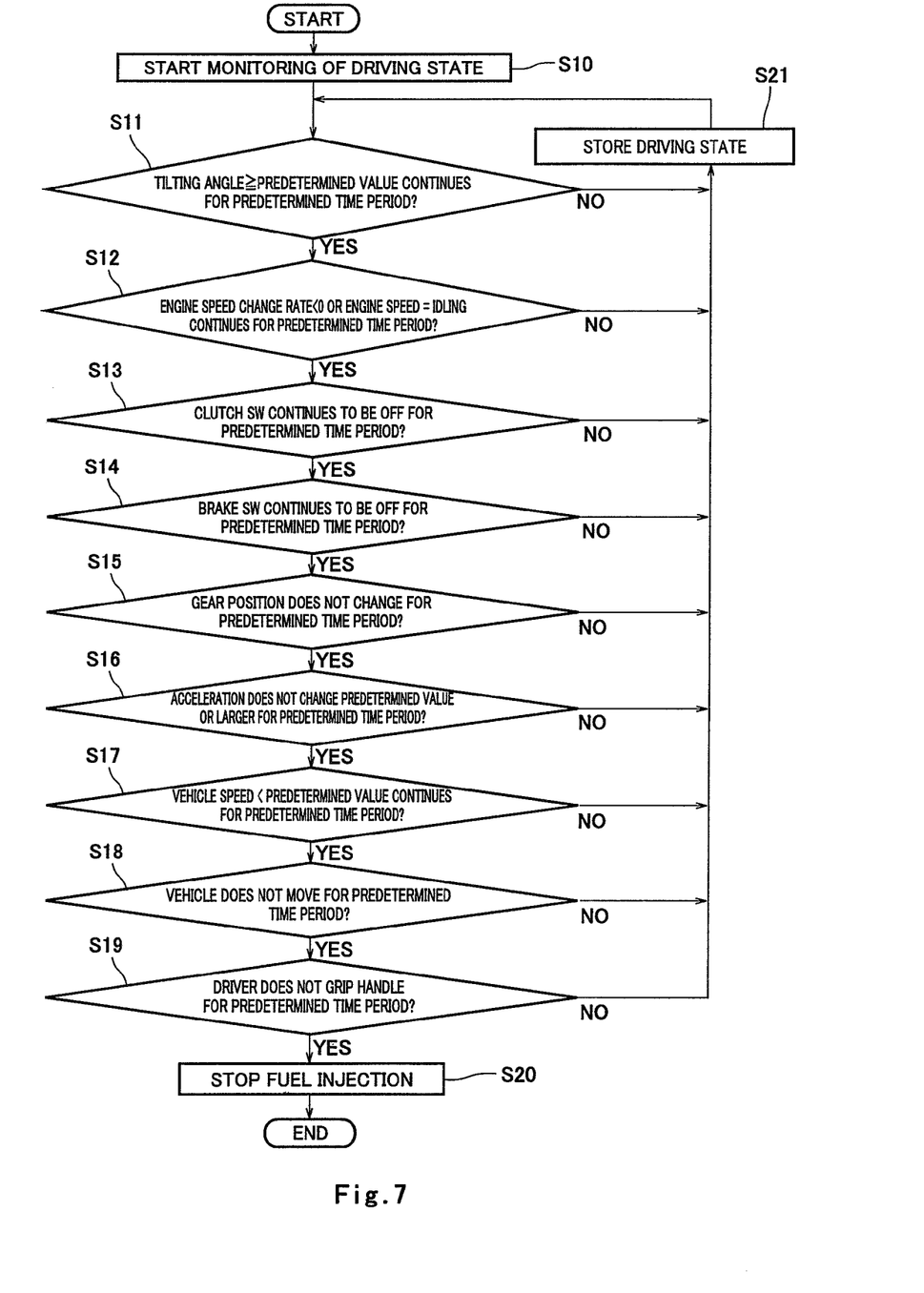
FIG. 7 is a flowchart showing a process executed by the engine stop system of FIG. 6.

Subsequently, a process executed by the engine stop system 40 will be described substantially with reference to FIG. 7. FIG. 7 is a flowchart showing the process executed by the engine stop system 40 of FIG. 6. Turning to FIG. 7, when the engine of the motorcycle starts, the determiner 51 (see FIG. 6) of the ECU 50 starts monitoring of a driving state of the motorcycle based on the signals received from the tilting sensor 25 and from the sensors and switches 41 to 48 (step S10). The determiner 51 calculates a tilting angle of the vehicle body based on the signal received from the tilting sensor 25 and determines whether or not the tilting angle of the vehicle body continues to be a predetermined value or larger (e.g., 70 degrees or larger) for a predetermined time period (step S11).

If it is determined that the tilting angle does not continue to be the predetermined value or larger for the predetermined time period (NO in step S11), the ECU 50 stores its driving state (time series history of the tilting angle of the vehicle body) in a memory (not shown) contained therein (step S21), and returns the process to step S11. On the other hand, if it is determined that the tilting angle continues to be the predetermined value or larger for the predetermined time period (YES in step S11), the determiner 51 calculates an engine speed based on the signal received from the engine speed sensor 41, and further determines whether or not the engine speed continues to be decreasing, i.e., a change rate of the engine speed continues to be smaller than zero for a predetermined time period, or the engine speed continues to be an idling engine speed for a predetermined time period (step S12).

If it is determined that the speed does not continue to be decreasing or to be the idling engine speed for the predetermined time period (NO in step S12), the ECU 50 stores its driving state (time series history of the engine speed) in the memory (not shown) contained therein (step S21), and returns the process to step S11. On the other hand, if it is determined that the engine speed continues to be decreasing or to be the idling engine speed for the predetermined time period (YES in step S12), the determiner 51 further determines whether or not the clutch switch 42 continues to be in an OFF-state (unoperated state) for a predetermined time period (step S13).

If it is determined that the clutch switch 42 does not continue to be in the OFF-state (unoperated state) for the predetermined time period (NO in step S13), the ECU 50 determines that the engine E should not be stopped and stores its driving state (time series history of the clutch operation state) in the memory contained therein (step S21), and returns the process to step S11. On the other hand, if it is determined that the clutch switch 42 continues to be in the OFF-state (unoperated state) for the predetermined time period (YES in step S13), the determiner 51 further determines whether or not the brake switch 43 continues to be in an OFF-state (unoperated state) for a predetermined time period (step S14).

If it is determined that the brake switch 43 does not continue to be in the OFF-state (unoperated state) for the predetermined time period (NO in step S14), the ECU 50 determines that the engine E should not be stopped and stores its driving state (history of the brake operation state in time series) in the memory contained therein (step S21), and returns the process to step S11. On the other hand, if it is determined that the brake switch 43 continues to be in the OFF-state (unoperated state) for the predetermined time period (YES in step S14), the determiner 51 detects a gear position based on the signal received from gear position sensor 44, and further determines whether or not the gear position does not change for a predetermined time period (step S15).

If it is determined that the gear position has changed within the predetermined time period (NO in step S15), the ECU 50 stores its driving state (time series history of the gear position) in the memory contained therein (step S21), and returns the process to step S11. On the other hand, if it is determined that the gear position of the transmission gear does not change for the predetermined time period (YES in step S15), the determiner 51 calculates an acceleration of the motorcycle based on the signal received from the acceleration sensor 45 and further determines whether or not the acceleration does not change a predetermined value or larger for a predetermined time period (step S16).

If it is determined that the acceleration has changed to the predetermined value or larger for the predetermined time period (NO in step S16), the ECU 50 determines that the engine E should not be stopped and stores its driving state (time series history of the acceleration) in the memory contained therein (step S21), and returns the process to step S11. On the other hand, if it is determined that the acceleration does not change to the predetermined value or larger for the predetermined time period (YES in step S16), the determiner 51 calculates a vehicle speed of the motorcycle based on the signal received from the vehicle speed sensor 46, and further determines whether or not the vehicle speed continues to be smaller than a predetermined value for a predetermined time period (step S17).

If it is determined that the vehicle speed does not continue to be smaller than the predetermined value for the predetermined time period (NO in step S17), the ECU 50 determines that the engine E should not be stopped and stores its driving state (time series history of the vehicle speed) in the memory contained therein (step S21), and returns the process to step S11. On the other hand, if it is determined that the vehicle speed continues to be smaller than the predetermined value for the predetermined time period (YES in step S17), the determiner 51 calculates location information of the motorcycle based on the signal received from the GPS sensor 47, and further determines whether or not the motorcycle 1 does not move for a predetermined time period (step S18).

If it is determined that the motorcycle 1 has moved within the predetermined time period (NO in step S18), the ECU 50 determines that the engine E should not be stopped and stores its driving state (time series history of the location information) in the memory contained therein (step S21), and returns the process to step S11. On the other hand, if it is determined that the motorcycle 1 does not move for the predetermined time period (YES in step S18), the determiner 51 further determines whether or not the driver does not grip the steering handle 5 (see FIG. 1) for a predetermined time period based on the signal received from the grip pressure-sensitive sensor 48 (step S19).

If it is determined that the driver has gripped the steering handle 5 within the predetermined time period (NO in step S19), the ECU 50 determines that the engine E should not be stopped and stores its driving state (time series history of the gripping state) in the memory contained therein (step S21), and returns the process to step S11. On the other hand, if it is determined that the driver does not grip the steering handle 5 for the predetermined time period (YES in step S19), then the ECU 50 determines that the engine E should be stopped, and causes the fuel injector 17 (see FIG. 6) to stop fuel injection (step S20).

In accordance with the above described configuration, it is determined whether or not to stop the engine E precisely in view of the driver's intension, by using the sensors and switches 41 to 48 which are able to detect the driving states of the motorcycle, in addition to the tilting sensor 25 which is able to detect the tilting angle of the motorcycle.

(Embodiment 3)

Figure 8:
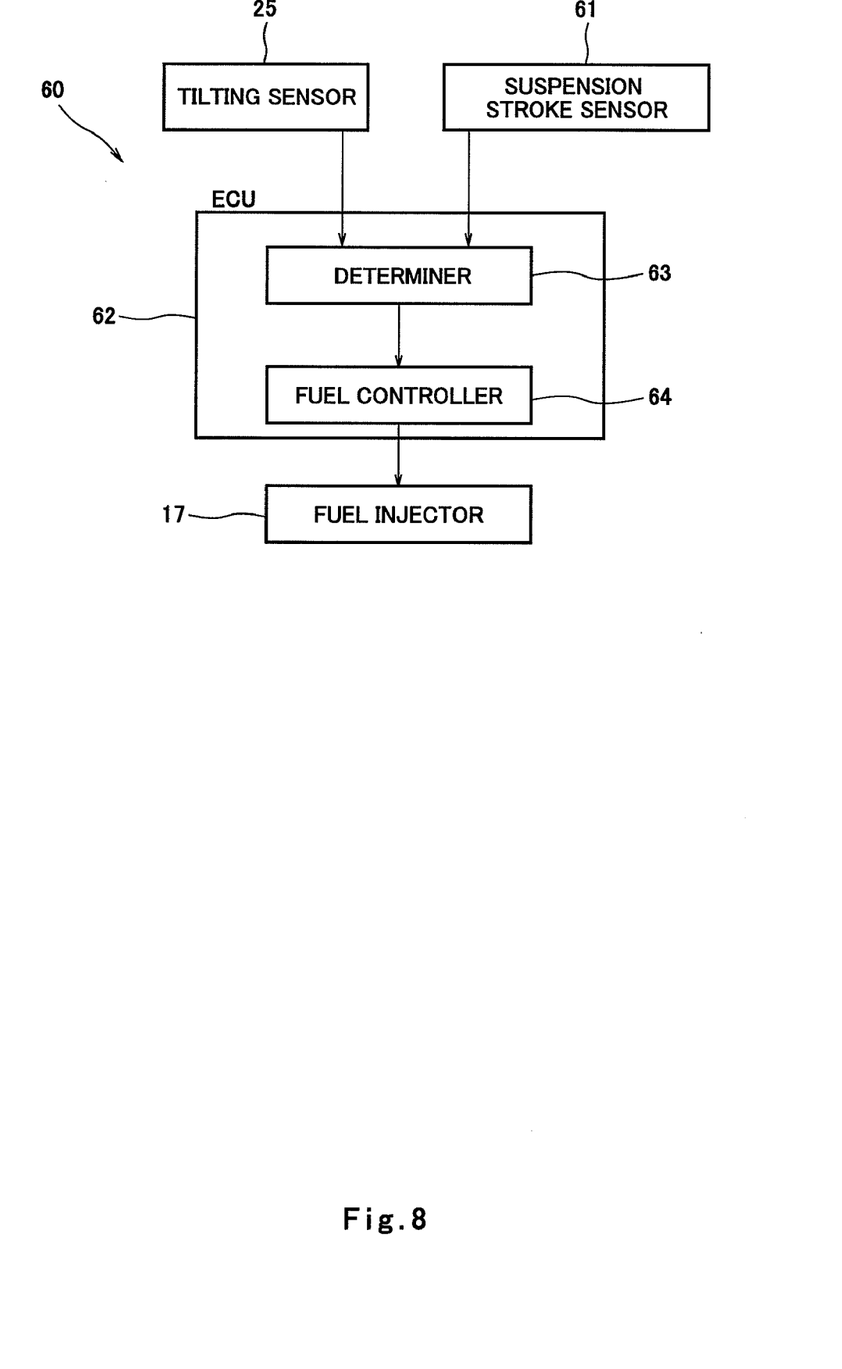
FIG. 8 is a block diagram showing an engine stop system of a motorcycle according to a third embodiment of the present invention.

FIG. 8 is a block diagram showing an engine stop system 60 of a motorcycle according to a third embodiment of the present invention. In FIG. 8, the same reference numerals as those in the first embodiment denotes the same or corresponding parts which will not be further described in the third embodiment. Turning to FIG. 8, the engine stop system 60 includes the tilting sensor 25, a suspension stroke sensor 61, an ECU 62 and the fuel injector 17. The suspension stroke sensor 61, which serves as the driving state sensor, is configured to detect an extended state and a contracted state, i.e., a suspension stroke amount of the rear suspension 14 which serves to absorb an impact applied to the motorcycle. For example, the suspension stroke sensor 61 may be a displacement sensor configured to detect a distance between an upper position and a lower position of the rear suspension 14, which is substantially vertically displaceable.

The ECU 62 is configured to control the fuel injector 17 based on the signal received from the tilting sensor 25 and a signal received from the suspension stroke sensor 61. To be specific, the ECU 62 includes a determiner 63 which determines whether or not to stop the engine E based on the signals received from the tilting sensor 25 and from the suspension stroke sensor 61, and a fuel controller 64 which controls the operation of the fuel injector 17 to stop fuel injection to the interior of the air-intake passage, when the determiner 63 determines that the engine E should be stopped.

Figure 9:
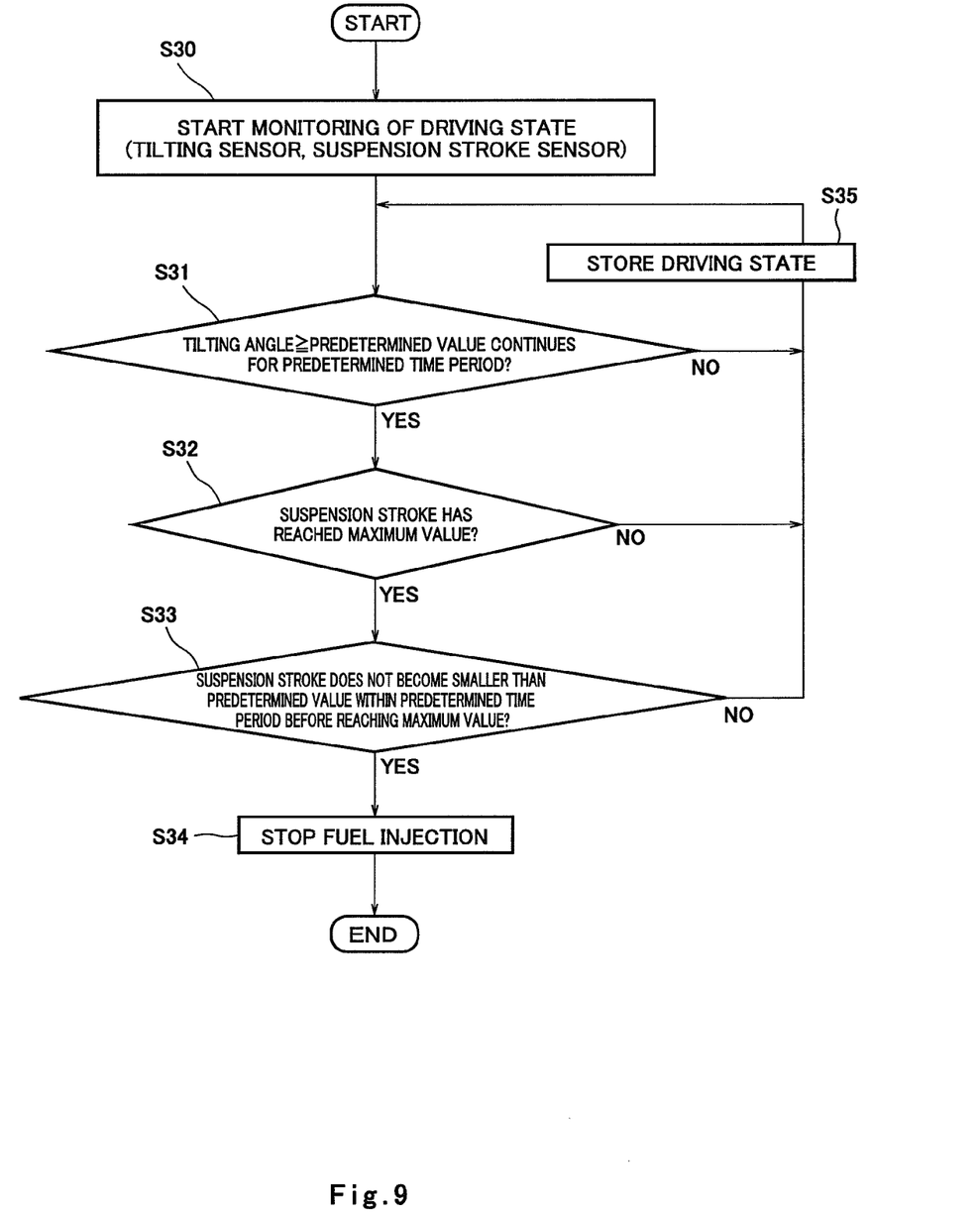
FIG. 9 is a flowchart showing a process executed by the engine stop system of FIG. 8.

Subsequently, a process executed by the engine stop system 60 will be described substantially with reference to FIG. 9. FIG. 9 is a flowchart showing the process executed by the engine stop system 60 of FIG. 8. Turning to FIG. 9, when the engine E of the motorcycle starts, the determiner 63 (see FIG. 8) of the ECU 62 starts monitoring of a driving state of the motorcycle based on the signals received from the tilting sensor 25 and from the suspension stroke sensor 61 (step S30). The determiner 63 calculates a tilting angle of the vehicle body based on the signal received from the tilting sensor 25 and determines whether or not the tilting angle of the vehicle body continues to be a predetermined value or larger (e.g., 70 degrees or larger) for a predetermined time period (step S31).

If it is determined that the tilting angle does not continue to be the predetermined value or larger for the predetermined time period (NO in step S31), the ECU 62 stores its driving state (time series history of the tilting angle of the vehicle body) in a memory (not shown) contained therein (step S35), and returns the process to step S31. On the other hand, if it is determined that the tilting angle continues to be the predetermined value or larger for the predetermined time period (YES in step S31), the determiner 63 calculates a suspension stroke amount (extension amount or contraction amount) of the rear suspension 14, based on the signal received from the suspension stroke sensor 61, and further determines whether or not the suspension stroke amount has reached a maximum value (step S32).

If it is determined that the suspension stroke amount does not reach the maximum value (NO in step S32), the ECU 62 stores its driving state (time series history of suspension stroke amount) in the memory (not shown) (step S35), and returns the process to step S31. On the other hand, if it is determined that the suspension stroke amount has reached the maximum value (YES in step S32), the ECU 62 further determines whether or not the suspension stroke amount does not become smaller than a predetermined value within a predetermined time period before the time point when the suspension stroke amount has reached the maximum value (step S33).

If it is determined that the suspension stroke amount has become smaller than the predetermined value within the predetermined time period before the time point when the suspension stroke amount has reached the maximum value (NO in step S33), the ECU 62 determines that the vehicle body is jumping and therefore the engine E should not be stopped, and stores its driving state (time series history of suspension stroke amount) in the memory (step S35), and returns the process to step S31. On the other hand, if it is determined that the suspension stroke amount does not become smaller than the predetermined value within the predetermined time period before the time point when the suspension stroke amount has reached the maximum value (YES in step S33), the determiner 63 determines that the engine E should be stopped, and causes the fuel injector 17 (see FIG. 8) to stop fuel injection (step S34).

In accordance with the above described configuration, it is determined that the engine E should not be stopped, if the driver is jumping the vehicle body of the motorcycle and the vehicle body is thereby tilted. In general, the suspension stroke amount becomes small for a moment before the vehicle body jumps and then reaches the maximum value while jumping because the vehicle body is not subjected to a load from a ground surface. Therefore, only when the suspension stroke amount does not comply with such an event, it may be determined that the engine E should be stopped. As a result, when the vehicle body is jumping and tilted according to the driver's intention, it is determined that the engine E should not be stopped.

The driving state sensor may be one of the throttle opening degree sensor, the engine speed sensor, the clutch switch, the brake switch, the gear position sensor, the acceleration sensor, the vehicle speed sensor, the GPS sensor, the grip pressure-sensitive sensor, and the suspension stroke sensor, or a combination of any of them. The tilting sensor may be any other sensors, instead of the tilting sensor which swings like the pendulum illustrated in the second embodiment, so long as it is capable of a tilting state of the vehicle body of the motorcycle. Furthermore, the present invention is applicable to personal watercraft (PWC), or three-wheeled or four-wheeled all terrain vehicles, as well as the motorcycle illustrated in the embodiments. When the present invention is applicable to the personal watercraft, sensors other than the vehicle speed sensor, the clutch switch, the brake switch, the gear position sensor, and the suspension stroke sensor may be suitably used.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle comprising:
    an engine;
    a tilting sensor configured to detect that a body of the vehicle is tilted a predetermined angle or larger;
    a driving state sensor including a GPS sensor configured to detect a location of the vehicle and configured to detect whether or not the vehicle has moved for a predetermined time period; and
    a determiner configured to determine whether or not to stop the engine, based on a signal received from the tilting sensor, and a signal received from the driving state sensor;
    wherein the determiner is configured to determine that the engine should be stopped when it is detected that the body of the vehicle is tilted a predetermined angle or larger and that the vehicle does not move for the predetermined time period.

2. The vehicle according to claim 1, further comprising:
    a fuel injector configured to inject a fuel to an interior of an air-intake passage connected to the engine; and
    a fuel controller configured to control an operation of the fuel injector;
    wherein the fuel controller is configured to cause the fuel injector to stop fuel injection to the interior of the air-intake passage when the determiner determines that the engine should be stopped.

3. The vehicle according to claim 1, wherein the predetermined angle is substantially 70 degrees.

4. The vehicle according to claim 1, wherein the vehicle is a motorcycle.

5. The vehicle according to claim 4, wherein the vehicle is an off-road motorcycle.

6. A vehicle comprising:
    an engine;
    a tilting sensor configured to detect that a body of the vehicle is tilted a predetermined angle or larger;
    a driving state sensor configured to detect a driving state of the vehicle using a component other than the tilting sensor; and
    a determiner configured to determine whether or not to stop the engine, based on a signal received from the tilting sensor, and a signal received from the driving state sensor;

wherein the driving state sensor is a suspension stroke sensor configured to detect a suspension stroke amount of a suspension in the vehicle which is substantially vertically displaceable; and wherein the determiner is configured to determine that the engine should not be stopped when the suspension stroke amount detected by the suspension stroke sensor reaches a maximum value and becomes smaller than a predetermined value within a predetermined time period before a time point when the suspension stroke amount reaches the maximum value.

7. A method of determining whether or not to stop an engine mounted in a vehicle, comprising:

detecting that a body of the vehicle is tilted a predetermined angle or larger;

detecting a driving state of the vehicle using a GPS sensor configured to detect a location of the vehicle and configured to detect that the vehicle does not move for a predetermined time period;

determining that the engine should be stopped when it is detected that the body of the vehicle is tilted the predetermined angle or larger and the vehicle does not move for the predetermined time period; and stopping fuel injection to an interior of an air-intake passage connected to the engine, when it is determined that the engine should be stopped.

* * * * *